US006766363B1

United States Patent
Rothschild (10) Patent No.: US 6,766,363 B1
(45) Date of Patent: *Jul. 20, 2004

(54) SYSTEM AND METHOD OF LINKING ITEMS IN AUDIO, VISUAL, AND PRINTED MEDIA TO RELATED INFORMATION STORED ON AN ELECTRONIC NETWORK USING A MOBILE DEVICE

(75) Inventor: Leigh M. Rothschild, Miami, FL (US)

(73) Assignee: Barpoint.com, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/652,943

(22) Filed: Aug. 31, 2000

Related U.S. Application Data (60) Provisional application No. 60/185,295, filed on Feb. 28, 2000, and provisional application No. 60/185,547, filed on Feb. 28, 2000.

(51) Int. Cl.[7] .............................. G06F 15/16; G06F 7/00
(52) U.S. Cl. ............................................ 709/219; 707/3
(58) Field of Search ................................ 709/217, 219, 709/225, 228; 707/3, 10; 705/26

(56) References Cited

U.S. PATENT DOCUMENTS

| | | | |
|---|---|---|---|
| 5,696,905 A | | 12/1997 | Reimer et al. |
| 5,715,400 A | | 2/1998 | Reimer et al. |
| 5,804,803 A | | 9/1998 | Cragun et al. |
| 5,905,248 A | | 5/1999 | Russell et al. |
| 5,905,251 A | | 5/1999 | Knowles |
| 5,932,863 A | | 8/1999 | Rathus et al. |
| 5,933,829 A | | 8/1999 | Durst et al. |
| 5,978,773 A | * | 11/1999 | Hudetz et al. ................ 705/23 |
| 5,992,752 A | | 11/1999 | Wilz, Sr. et al. |
| 6,027,024 A | | 2/2000 | Knowles |
| 6,101,534 A | * | 8/2000 | Rothschild .................. 709/217 |
| 6,108,656 A | | 8/2000 | Durst et al. |
| 6,400,407 B1 | * | 6/2002 | Zigmond et al. ........... 348/465 |
| 6,426,778 B1 | * | 7/2002 | Valdez, Jr. .................. 348/461 |
| 6,430,554 B1 | * | 8/2002 | Rothschild ..................... 707/3 |
| 6,448,979 B1 | * | 9/2002 | Schena et al. ............... 345/741 |
| 6,651,053 B1 | * | 11/2003 | Rothschild ..................... 707/3 |
| 2002/0085025 A1 | * | 7/2002 | Busis et al. ................. 345/738 |
| 2003/0155413 A1 | * | 8/2003 | Kovesdi et al. ............. 235/375 |

FOREIGN PATENT DOCUMENTS

WO     WO 200045302 A1 *   8/2000       G06F/3/06

OTHER PUBLICATIONS

Bodenhamer, Lori, "Bar codes make online grocery shopping easier", www.techTV.com, 1 page, Nov. 1999.*
Chen Ding et al., "Reverse mapping of referral links from storage hierarchy for Web documents", IEEE International Conf. on Tools with Artificial Intelligence, pp. 216–219, Nov. 2000.*
McDonough, Brian, "Cingular, BarPoint nudge wireless userrs toward M–Commerce", www.wirelessnewsfactor.com/perl/story/12463.html, pp. 1–2, Aug. 2001.*

* cited by examiner

*Primary Examiner*—Jason D. Cardone
(74) *Attorney, Agent, or Firm*—Anthony J. Casella; Gerald E. Hespos (57) ABSTRACT

A system and method for enabling a user with a mobile device to link to information, on a local or global electronic network, related to an item of interest to the user while observing a visual, audio, or printed medium containing the item. Linking is accomplished by an item information provider creating codes that can be utilized by the user to implement a link between the user's device and an item information containing server programmed by the provider. The user can select the item by inputting codes to the device and be instantly linked to a database in the server on which item information is stored by the provider along with associated information to link to a network website specifically containing further item-related information for user access. If the user doesn't wish to access the information immediately, the mobile device may be used to "bookmark" or store the user's coded information request and the user may link to the server and retrieve the desired information when convenient.

21 Claims, 1 Drawing Sheet

FIG. 1

SYSTEM AND METHOD OF LINKING ITEMS IN AUDIO, VISUAL, AND PRINTED MEDIA TO RELATED INFORMATION STORED ON AN ELECTRONIC NETWORK USING A MOBILE DEVICE

CROSS-REFERENCE TO RELATED APPLICATIONS

This application is based on U.S. Provisional Patent Application, U.S. Serial No. 60/185,295, which was filed Feb. 28, 2000 and is entitled "METHOD OF LINKING AUDIO AND/OR VISUAL MEDIUM TO INFORMATION ON A GLOBAL COMPUTER NETWORK" and U.S. Provisional Patent Application, U.S. Serial No. 60/185,547, which was filed Feb. 28, 2000 and is entitled "METHOD OF LINKING PRINTED MATTER TO INFORMATION ON A GLOBAL COMPUTER NETWORK", both disclosures of which are incorporated herein by reference.

BACKGROUND OF THE INVENTION

1. Field of the Invention

The present invention relates to a system and method for enabling a user to quickly search an electronic or computer network, such as the Internet, for information related to media items observed by and of interest to the user, and, more particularly, to a method and means by which a user can, using a mobile device, quickly link to electronic databases, located locally and/or on a global computer network, that contain information associated with items in audio, visual, and printed media observed by the user, which information is compiled by a provider connected with the media item of interest with content related thereto and accessible by suitable coding.

2. Description of the Related Art

Global electronic and computer networks, such as the Internet, provide access to a tremendous amount of information relating to myriad topics and items such as various products, manufacturers, distributors, news, entertainment, and providers of services. It is difficult, however, for a user to investigate a particular item, e.g., a product, on a global computer network when the product is sold under more than one name, or when the user is not sure of the proper name of the product or its source. Similarly, the user may not know how to particularly identify an item that is seen or heard in a visual or audio medium or printed material in order to link to information of interest related to that item. It, therefore, can be quite a time-consuming and complex procedure to do an effective search on an item of interest, observed by a user, through all of the web sites and databases available that may contain pertinent information.

As the global computer networks, such as the Internet, are now capable of being accessed by various mobile devices in addition to landline based devices, searches that are complex and time-consuming are a deterrent to the use of these devices for that purpose. These mobile devices include Internet telephones, Internet PDA'S, and various other such Internet portable devices. Many of the devices allow instant access to the Internet through wireless modems or other means, and some allow the collection of information and then the transfer of that information to landline based (desktop) computers for use when accessing the Internet. The PALM VII wireless PDA is an example of a current internet capable wireless device, the PALM III-V is an example of a current PDA that can transfer information for later internet access. Such mobile devices allow their users to have tremendous amounts of information available to them on a mobile basis. Services such as BarPoint, Yahoo, CNN, and the Weather Channel are all currently available on a variety of wireless devices. For example, the BarPoint service, which is at least partly described in the above-noted priority application, allows users to access information on products using their UPC numbers or to link to other information based on other machine readable symbologies or numerical codes. The Barpoint service uses an implementing server containing a database of product and manufacturer or provider identifying codes, e.g., UPC manufacturer codes, so that information relating to a particular product and its manufacturer, can be quickly obtained with the product's UPC. The entire UPC is input to the implementing server, which reads the manufacturer's code from the UPC and, using the UPC database therein, identifies the manufacturer. The server is programmed to then perform a search of the global computer network to locate sites relating to or operated by the manufacturer. Additionally, the server may search the global computer network on a product basis to locate other sites containing the UPC under search. To aid the server, and reduce search time, the user can identify the general category of the product (auto, book, music or movie cassette, food, hardware, software, etc.) when the UPC is entered.

3. Problem to be Solved

While these known service systems enable a user to link to information related to products of interest which are being or have been observed, it will be seen that there is a need for a system that will enable the user to quickly link to information particularly related to specific items contained in various media content, including images and audio and printed materials transmitted or provided by some local medium such as video tape, mass digital storage devices, DVDs, CD-ROMS, movies, television, radio, books, catalogs, etc., during observation. Accordingly, a need is perceived for a user, while viewing an image, or hearing audio, or reading printed material, to be able to quickly relate a specific or exact part of the content of that image, audio, or printed matter to a particular site or sites on an electronic network, such as by linking to a site on the global computer network or Internet, particularly using a mobile device.

4. Objects of the Invention

It is therefore an object of the present invention to provide a system and method whereby a user can quickly and easily obtain a supply of available information about a specific item observed in an audio or visual or printed media, by linking to a local or global electronic or computer network.

It is another object of the present invention to provide a system and method whereby a user can quickly and easily obtain a supply of available information about a specific item observed in an audio or visual or printed media, by linking to a local or global electronic or computer network with the use of a mobile device.

It is another object of the invention to provide a system and method for quickly and easily linking a mobile device to a local or global computer network to access information about an item being observed in any of an audio, visual, or printed media, the content of which information may be supplied by a provider of the item of interest.

It is a further object of the invention to provide an interactive system and method that enables a user with a mobile device to quickly search a local or global electronic network and easily obtain a supply of information about the content of an item while observing audio works, visual images, and printed media, by linking to a database in a local or global computer network using codes that can be utilized by the information content provider, and the user requesting the link, to produce the link.

SUMMARY OF THE INVENTION

The present invention is directed to a system and method for achieving the above-mentioned objectives by enabling a user with a desktop computer or mobile device to link to information, on a local or global electronic network, e.g., the Internet, that is related to a content item of interest to the user while observing any of a visual, audio, or printed medium containing the item, which linking is accomplished by creating codes that can be utilized by both the information content provider and the user requesting the link to implement the link.

In one embodiment of the invention regarding an item in a visual medium, a user watching television in his home, where the source of the program may be a broadcast or a video tape or DVD, sees something of interest, such as an attractive actress or automobile, on which he would like to have more information. The user may take out his mobile device, press a button or enter keystrokes to select the item of interest and instantly he is linked to a server providing information made available on the actress stored by the producer on an internet website specifically for user access, or information is presented on the automobile that is stored by the manufacturer. Also, if the user does not wish to access this information while watching the program, the mobile device may be used to "bookmark" the user's request for information on the actress and automobile and any other observed item, or the user may simply record the request on paper, and the user may then link to the server, access and retrieve the desired information when the program ends or at any time in the future.

Regarding the linking operation, in the event, for example, that the user would like to receive information on a television commercial or event, he may input to the server: the category, i.e., television; his location, unless he wishes the server to assume that he is at his home based city which the server knows from the user's ID; the channel he is watching; and the approximate time and date of the commercial or event. The commercial may be marked with a marking icon or dot or other symbology so that the user knows that the information is available. The commercial content producer will have previously placed the content category/channel/time of broadcast, the date of broadcast/content/associated content link onto the server. The server may then resolve the user's request and provide the user the requested information. If several links occur near the user's reported time then the server may give the user a choice of several content sources. The user may then receive the requested content and be able to gain further access to additional content with additionally supplied global computer network links, and, if utilizing a mobile device, the user may also be able to transmit the content including associated links, to another computer, e.g., a home based computer, for later access.

Television viewing applications may also have extra utility with respect to commercials and home shopping as the user can request information on an item seen in a television commercial or a home shopping product, and then actually purchase the item on the spot by transmitting the purchase request from their computer or mobile device to the information site or other site as indicated.

DETAILED DESCRIPTION OF THE PREFERRED EMBODIMENTS

The present invention involves a system and method to link to information, relating to an item being observed by a user in any of a visual, audio, or printed medium, on a local or global computer network, e.g., the Internet, which linking is accomplished by creating codes that can be utilized by the information content provider, and the user requesting the link, to produce the link. More particularly, a system in accordance with the invention enables the user to quickly link to information related to specific items contained in various media content, including images and audio and printed materials transmitted or presented by some local medium, during observation by the user. The medium in the case of images, for example, may be movies, television, video tape, mass digital storage devices, DVDs, or CD-ROMS, in the case of audio it may be radio, CD, or tape, and in the case of printed matter it may be an advertisement, book, catalog, periodical magazine, newspaper, or flyer. Accordingly, a user, while viewing an image, or hearing audio, or reading printed material, may quickly select an item in, or an exact part of, that image, audio, or printed material and connect to a related site or sites on an electronic network, such as by linking to a site on the Internet, to obtain information concerning the item offered by an item provider, particularly with the use of a mobile device.

Figure 1:
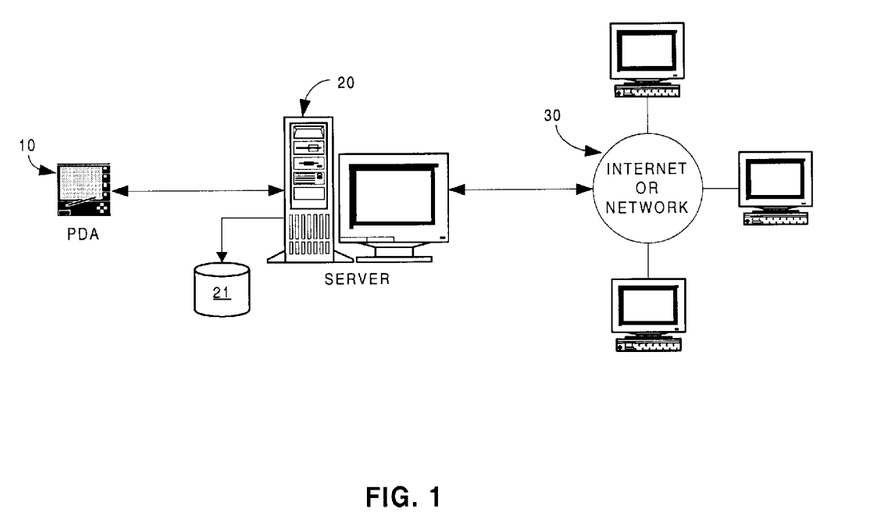
FIG. 1 is a block diagram illustrating a system in accordance with the present invention and showing the exchange of coded information for linking to a global computer network.

In accordance with the invention, as seen in FIG. 1, a user with a suitable terminal 10, i.e., a mobile device such as a wireless portable computer, e.g., a Portable Digital Assistant (PDA), can access an implementing server 20 which is provided with a database 21 of content information linked to a related site or sites on the global computer network or Internet 30. The server 20 is programmed to accept a transmission from the PDA 10 requesting a link with information content related to an observed item of interest to the user. The server 20 may be activated to send appropriate content information from the local database 21 therein back to the PDA 10 for viewing and selection or storage, and to link to sites on the global computer network 30 with additional content information relating to the observed item provided by the content information producer. The server 20 can accordingly quickly assemble a collection of content information on the item of interest for sending to the user's PDA. The collection of content information is then available for the user's consideration all at once at any time on the PDA 10. With this capability, the user can immediately link to information on an item of interest while observing media, visual or audio or printed, of which the item is a part. The PDA 10 and server 20 may be provided with software to enable their interaction through a wireless transmission path to transfer a coded request and coded information linked by a provider to the server therebetween.

It should be understood that the system and method of the subject invention can be implemented whether the user has a mobile device or not. The system and method can be implemented on a personal or desktop computer, where the same information inputted into the mobile device, may be inputted to a landline computer. In this situation, the user can either memorize the information or manually record the information on paper for later input. The following examples illustrating the system and method will be presented in a preferred embodiment utilizing a mobile device.

Selecting:

Examples of applications of the invention with respect to the user's selecting of items of interest in various media are as follows.

Visual Medium—Movie:

By way of illustrating an application of the invention with regard to an item in a visual medium, consider a user watching a movie in a theater who sees something in the movie, such as a foreign sports car, that he finds to be of interest. The user may take out his mobile device, e.g., a PALM VII wireless PDA, press an appropriate button or enter several keystrokes to indicate the category or topic of interest, e.g., name of the film. Also, in response to the category input the user may be given a list of films to select from, that is transmitted from the global computer network or Internet. In either event, when the user selects the item of interest on his mobile device, e.g., a PALM VII wireless PDA, instantly information can be made available on the foreign sports car, which information has been stored by the manufacturer on an Internet website specifically for a user's access, or, if the user does not wish to access this information while in the movie theater, the mobile device may be used to "bookmark" the user's request for information on the automobile, and the user can then access and retrieve the information of interest at any convenient time in the future. Once the user accesses this information on his mobile device he may then save it in storage on the device, or, due to the small screen size of many mobile devices, he can instruct the device to send the information to a personal web page that can be viewed at home on a larger display such as on a television or a landline based computer. Consequently, the user is enabled to quickly link to and access information on the content of an item while observing the media in which the item is found.

In the event that the user may see several things in the movie that are of interest, upon appropriately pressing the button on his mobile device, information may be made instantly available on the several things that each of the manufacturers or producers have stored on internet websites specifically for user access. When the user accesses this information on his mobile device he can store it on the device, or again, instruct the device to send the information to a personal web page that he can view from his home on a landline based computer.

Visual Medium—TV Program:

Another example illustrative of an application of the invention with regard to an item in a visual medium may involve a user watching television in his home, where the source of the program may be a broadcast or a video tape or DVD, and the user sees something of interest, such as an attractive actress or automobile, on which he would like to have more information. As in the case of the movie, the user may take out his mobile device, press a button or enter keystrokes and instantly information is made available on the actress that the producer has stored on an internet website specifically for user access, or information is presented on the automobile that is stored by the manufacturer. Also, if the user does not wish to access this information while watching the program, the mobile device may be used to bookmark the user's request for information on the actress and automobile and any other observed item, and the user may then retrieve and access the information when the program ends or at any time in the future.

Television viewing applications may also have extra utility with respect to commercials and home shopping as the user can request information on an item seen in a television commercial or a home shopping product, and then actually purchase the item on the spot by transmitting the purchase request from the mobile device to the information site or other site as indicated.

Audio Medium—Music:

An example illustrative of an application of the invention with regard to an item in an audio medium may involve a user listening to an audio work or program, e.g., music, either on a broadcast or from a local source such as a tape or CD, who wishes information on a particular song or artist of interest. The user may take out his mobile device while listening, press an appropriate button or stroke some keys and instantly information is made available on that song or artist that the producer has stored on an internet website specifically for user access, or, if the user does not wish to access the information while listening to the rest of the audio program, the mobile device can be used to "bookmark" the user's request for information on the artist, and the user then has the ability to access or retrieve the information at any time in the future. As with the visual item example, when the user accesses the information of interest on his mobile device he may then save it in storage on the device, or instruct the device to send the information to a personal web page that he can view from his home on a landline based computer.

Print Medium—Newspaper, Periodicals:

A particular example illustrative of an application of the invention with regard to a printed medium may involve a user reading a story in a newspaper or magazine that is of interest to him. The user may take out his mobile device, enter several keystrokes or press a button and instantly further information is available on that story that the content provider has stored on an internet website specifically for the user's access, or, if the user does not wish to access the information at that particular moment, he may use the mobile device to bookmark the request for information on the story and the user will then have access to retrieving this information at a later time for viewing on his mobile device or landline based computer.

Options related to the use of the information can include the ability of the user to (a) receive more information on the story, (b) e-mail the author of the story, (c) e-mail the entire story to any other address on the global computer network (Internet), (d) enter into a discussion group on the story with other parties on the Internet, and (e) request additional information related to the subject matter of the story.

Print Medium—Book:

Another such example may involve a user reading a book or an article in a newspaper, magazine, etc. The user sees a passage in the book that the publisher has bolded or otherwise identified as a passage for which additional information is available. Using his mobile device to enter several keystrokes will instantly make information available on the passage that the content provider has stored on an Internet website specifically for the users' access. If the user does not wish to access this information at that particular moment, the mobile device can be used to "bookmark" the user's request for information on the content and the user then has preserved access to the information and can retrieve it at any later time. Again, once the user accesses this information on his mobile device he may then save it in storage on the device, or instruct the device to send the information to a personal web page that he can view from his home television or landline based computer.

It should be understood that the foregoing applications may be implemented whether the user has a mobile device that can connect to the Internet, such as current PALM VII wireless PDAs or an internet enabled WAP phone, or is a standard non-communication PDA. In the event of the non-communication PDA, the information link may be stored on the PDA and then later communicated to a device connected to the global computer network or Internet where the information link is then communicated to the server and the information requested is resolved. Additionally, in the event a user does not have a mobile device, the information relating to the media may be manually recorded and later input into a device, i.e., computer, connected to the global information network or Internet where the information link is then communicated to the server and the information requested is resolved.

Linking:

To accomplish the various applications in accordance with the invention, the desired links are achieved by creating codes that can be utilized by the information content producer or provider when creating the link, and by the user when requesting the link to interact with the linked server. For example, in the event that a user would like to receive information on a television commercial, he may input to the server: the category, i.e., television; his location, unless he wishes the server to assume that he is at his home based city which the server knows from the user's ID; the channel he is watching; and the approximate time and date of broadcast of the commercial. If desired, the commercial may be marked with a marking icon or dot or other symbology so that the user knows that the information is available. The commercial content producer will have previously placed the content category/channel/time of broadcast, the date of broadcast/content/associated content link onto the server. The server may then resolve the user's request and provide the user the requested information. If several links occur near the user's reported time then the server may give the user a choice of several content sources. The user may then receive the requested content and be able to have further access to additional content with additionally supplied global computer network links, and also be able to transmit the content including associated links, to another computer, e.g., a home based computer, for later access. All of the accessed information may be collected and stored on the mobile device to provide a supply of content information from the global computer network ready for presentation to the user when desired.

Visual Medium—Movie:

For instance, in accomplishing linking for images such as in films or movies, the desired linker or content producer may put standard information links, e.g., URL addresses or information content, on a computer server, such as that provided by the Barpoint service mentioned above, that accesses a global computer network such as the Internet. The information content at the link addresses may be cross related to the film by such characteristics as the name of the film, the location of the film's release, the exact time elapsed into the film when the image or item of interest occurs, and any other defining/identification parameters relating to images or items of interest.

More particularly, for example, if the producer of the movie "The Thomas Crowne Affair" wished to provide a link to the car that the character drives in one part of the movie, the producer would input to the server that the information about the movie that he wants to set up a link to is:

Thomas Crowne (1999),

The time the car is seen is 3–4 minutes into the movie,

And then again 8–11 minutes into the movie,

And then again 19–30 minutes into the movie.

The producer would then provide to the computer server the information content that he wants related to the car, e.g., in this case a digital image of the car and a description:

1999 Aston Martin DB7,

0–60 4.8 seconds, gun mounted turrets in front and back,

Complete information and video of car available at www.astonmartin.com.

The content producer may also place a marking icon or dot or some other highlighting or symbology in the film content signifying to the viewing user that linked information is available for this portion of the film.

The computer server having received the producer's input may then place this information at a central site that is accessible from selected mobile devices or a search website, e.g., the BarPoint site. The server operator can code the link by the same code to signify the type of content, the film's name, the time of event occurrence, and the associated content.

For example, in the above instance the code might be:

Film/ThomasCR/3–4,8–11, 19–30/aston

The user interested in accessing the information may then use his mobile device and input the category type to which he would like to link, which in this case would be a film. The user may then indicate the name of the film, or even in response to the category input be given a list of films to select from, that is transmitted from the global computer network or Internet. Once the user selects the information, he may then indicate the time that the requested link occurred. If the user has a mobile device with memory capabilities (like a PDA) while watching the film, he can click on a button to "bookmark" where he wishes to access information. In this case the user would also have to 'mark' the starting time of the film.

The user's mobile device would then be used to transmit to the server the category of the content, the name of the film, the elapsed time at which the linked event occurred, and the user's ID information all in a unique link code created for the purpose.

The server upon receiving the coded information would lookup its database to find if any films containing the title are resident, and, if any content exists for the times specified by the user, lookup the associated content for the link that was found. In the case of the present example, the server would find that for the film "The Thomas Crowne Affair" a link exists for a time event at 3.8 minutes into the film. It may then send the content associated with that event back to the user's mobile device for display or storage.

In the event that the user transmits a rough estimate of elapsed time or that during the time or times indicated there were several linked events, then the server may act to resolve the links by presenting all possible linked events to the user that are closest to the time the user indicated, and the user can select the event or events regarding which he is interested in receiving further information.

The user may receive the initial content and be able to have access to further related content with additional supplied global computer network links, and also be able to transmit the content, including associated links, to another computer, such as a home based computer, for later access.

Visual Medium—TV Program:

By way of an exemplary embodiment involving linking for images on television, the content producer or other person desiring to provide a link can put standard information links, e.g., URL addresses or information content, on the computer server that accesses the global computer network or Internet. These addresses or information content may be cross related to the television show by the name of the show, the location of the show's airing release, the channel the show is to be broadcast on, the exact time elapsed into the show, and any other defining or identification parameters. More particularly, for instance, regarding the present case, if a producer of a local TV News show wished to link a story featured in the news to the Internet, the content producer would input to the server that the name of the television show he wanted to set up a link to is:

Channel 10 Evening News Episode 336.

If the particular news segment that is to be linked to occurs within 6–6.5 minutes of the show's broadcast, the producer may give the computer server the content that he wants related to the segment, e.g., a digital image of a crime scene in Miami, and a description such as:

Crime Scene of Jones Murder,

Loretta Jones found dead in Biscayne Bay,

Extensive Video interview with Jones at www.channel1OMiami.com/jones.

Again, the content producer may also place a marking icon or dot into the content signifying to the user that linked information is available for this portion of the television program.

The computer server would then be programmed to place the information from the provider at a central site that is accessible from selected mobile devices or a search website, e.g., the BarPoint site. The server operator can then code the link using an appropriate code to signify the type of content, the name of the television show, the time the event occurred, and the associated content, such as follows:

Television/CTEN E336/6–6.5/channel1Omiami/jones

The user wishing to access the content can then use his mobile device to input the category type to which he would like to link. In this case it would be a television program, the News. The user may then indicate the name of the television program sought, or he may be given a list of television shows, transmitted from the server, that were broadcast that day in the User's area from which he can select. After the user selects the show he is interested in, he then indicates the time that the requested link occurred in order to access the information. If, while watching the television show, the user has a device with memory capabilities, such as a PDA, he may click on a button to 'mark' at what point he wishes to access information. In this case the user would not have to 'mark' the starting time of the television show since the server would know what time the show started from other information sources.

The user's mobile device would thus be used to transmit to the server the category of content, the name of the television show, the elapsed time at which the linked event occurred, and the user's ID information, all in a unique link code.

Upon receiving the request, the server is programmed to lookup its database to find if any television shows containing the title requested are resident therein, and then whether any content exists for the time specified by the user and then access the associated content for the link that is found. In this case the server would find that for the News show on Channel 1O it does have a link for a time event of 6–6.25 minutes into the show. It can then send the content associated with that event back to the user's mobile device. Since the server has been informed of the particular user's ID when receiving the request, the information and format can be tailored for the individual user.

In the event that the user transmits a rough estimate of elapsed time or that during the time or times indicated there were several linked events, then the server can resolve the links by presenting to the user all possible linked events closest to the time the user has indicated, and the user can select the event or events on which he is interested in receiving further information.

Combined Media—Audio/Video:

To accomplish linking for Images such as audio/video on DVDs, video tape, etc., the desired linker (content producer) would put standard information links, e.g. URL addresses or information content, on the computer server that accesses the global computer network (Internet). The addresses or information content would be cross related to the audio/video by the name of the audio/video or the audio/video's distinct UPC number, the exact time elapsed into the audio/video, and any other defining or identification parameters. For instance, using the above-noted movie as an example, if the producer of "The Spy Who Shagged Me" wanted to link to the watch that the Austin Powers character has on in one part of the movie, the producer would inform the server that the name of the movie he wants to create a link to is:

The Spy Who Shagged Me (1999),

UPC 023456767123,

The time the watch is seen is 15.0 minutes into the video.

The producer would then give the computer server the content that he wants related to the watch, in this case a digital image of the watch and a description:

Shagadelic Swatch Watch for Sale,

Super Funky and Great Timepiece,

Only $25.95,

Complete information and video of watch available at www.spywhoshaggedme.com/watchoffer.

The content producer may also place a marker in the audio/video, such as a marking icon or dot into the video content, signifying to the user that linked information is available for this portion of the video. In the case of audio the marker may be some kind of sound or audio tone.

The computer server may then place the image and description information at a central site that is accessible from the selected mobile devices or search website (e.g., the BarPoint site). The server operator may code the link by the same code to signify the type of content, audio/video name/UPC number, time of event occurrence, and associated content. For example, in the above event the code might be:

Video/SpyShagged,023456767123/15.0/spyshagged.watchoffer

The user may then access his mobile device and input the category type to which he wishes to link. In this case it would be audio/video. The user can then indicate the name or the UPC of the audio/video. Once the user inputs this information, he would then indicate the time that the requested link occurred. If the user has a device with memory capabilities, such as a PDA, while listening/watching the audio/video he can click on a button to 'mark' where he wishes to access information. In this case the user would also have to 'mark' the starting time of the audio/video.

Having so indicated the selected information, the user may then use the mobile device to transmit to the server the category of content, the name of the audio/video or UPC number, the elapsed time at which the linked event occurred, the starting time of the audio/video and the user's id information, all in a unique link code.

The server upon receiving the transmitted information is programmed to then look-up its database to find if any audio/videos containing the title or UPC are resident and, if any content exists for the times specified by the user, then the associated content for the link that was found. In this case, the server would find that for the video "The Spy Who Shagged Me" there is a link for a time event of 15.0 minutes into the video. It would then send the content associated with that event back to the user's mobile device.

In the event that the user transmits a rough estimate of the elapsed time or that during the time(s) indicated there were several linked events, then the server can resolve the links by presenting all possible linked events to the user, closest to the time the user indicated, and the user can select the event or events of interest on which further information is sought and content may be received.

The user may receive the content and be able to have access to further content with additional supplied global computer network links, and also to transmit the content including associated links, to another computer, e.g., home based, for later access.

Print Media—Periodicals, Newspapers, Magazines:

Prior art relating to identification barcodes or other symbology placed on content produced by a provider, such as found in U.S. Pat. Nos. 5,933,829 and 5,978,773, assigned to NeoMedia, and pending application U.S. Serial No. 60/118,051 of the present inventor, discusses placing barcodes or other symbology next to or adjacent or as part of the content that the provider wants linked to a particular global computer network (Internet) location. While this may be practical for a one-page flyer containing content, it is generally not suitable for a newspaper or magazine that contains many stories and many items of interest that might be linked to. To place symbologies such as barcodes next to each desired article to be linked would prove to be both cumbersome and graphically intrusive. The present invention provides a system and method to link to particular content without having to put symbologies next to that content, and in the magazine embodiment to be described below details indexing content by creating a code link using just the variables of the UPC number of the magazine, the UPC number of the edition (if applicable), and page number. The exact sequence and procedure for the links are as follows.

The desired linker (content producer) puts standard information links, e.g., URL addresses or information content, on the computer server that accesses the global computer network (Internet). These addresses or information content are cross related to the newspaper/magazine content by the UPC number of the magazine, the UPC number of the edition (if applicable), and the page number of the content, and any other identification or defining parameters. For instance, using the above newspaper example, if the editor of the Miami Herald desired to link to a story on page 4 in the Feb. 20, 2000 edition of the paper, he would inform the server that the name of the story he wishes to link to is:

Periodicals-Newspapers,
Jones Murder,
UPC Number 3084678567631,
UPC edition 30456,
Page Number 28A.

The editor can then give the computer server the content that he wishes to relate to the story, in this case a digital image of the crime scene in Miami and a description.

Jones Murder
Additional background on investigation and interview with Det. Smith
www.miamiherald.com/jones/smith The content producer may also place highlighting or a marking icon or dot into the story signifying to the user that linked information is available for this story.

The computer server may then place this content at a central site that is accessible from the selected mobile devices or search website (e.g., the BarPoint site). The server operator would code the link by the above-supplied information. For example, in the above event the unique code might be:

Periodicals-Newspapers/UPC Number 3084678567631/
UPC edition 30456/Page
Number 28A/JonesMurder/miamiherald.com/jones/smith A user interested in linking to a content item in the story may then access his mobile device and input the category type to which he would like to link. In this case it would be Periodicals-Newspapers. The user may then indicate the UPC of the periodical, the UPC number of the edition (if applicable), and the page number of the content. Once the user selects and indicates this information, the user's device may be used to transmit the information to the server and the user's ID information all in a unique code. The server, upon receiving the transmitted information, may then be programmed to lookup its database to find if any item matches the requested content item and then inform the user of the item or items that match the request. In the event that the server resolves the request with several items that match, because in this case several linked items may be in this edition of the newspaper on the same page, then the user can be given the choice by name to select the item of interest. For example, the server might transmit, Jones Murder Case,
Clinton Budget Review,
Is there life on Mars?

A further example of the indexing of content, in this case an advertisement in a magazine or newspaper, by creating a code link using just the variables of the UPC number of the magazine or newspaper, the UPC number of the edition (if applicable), and the page number will now be detailed and an exact sequence and procedure for the links are as follows.

The desired linker (advertiser) would put standard information links, e.g., URL addresses or information content, onto the computer server that accesses the global computer network or Internet. The addresses or information content would be cross-related to the individual advertisement by the UPC number of the newspaper or magazine, the UPC of the edition of the magazine or newspaper (if applicable), and the page number of the content, and any other defining or identification parameters. For instance, if Procter and Gamble wished to link an ad on page 4 in the Mar. 1, 2000 edition of Newsweek, the editor would inform the server that the name of the item or ad he wants to link to is:

Periodicals-Magazines,
Charmin ad,
UPC Number 123456789012,
UPC edition 1234,
Page Number 4.

The editor would then give the computer server the content that he wishes to relate to the ad, in this case a videostream commercial of the ad and a description:

Charmin Ad,
Its so Fluffy!
www.charmin.com/videoitssofluffy

The advertiser may also place highlighting or a marking icon or dot signifying to the user that linked additional content is available for this advertisement.

The computer server may be programmed to place this content at a central site that is accessible from the selected mobile devices or search website (e.g., the BarPoint site). The server operator would code the link using the above-supplied information. For example, in the above event the unique code might be:

Periodicals-Magazines/UPC Number|23456789012/UPC edition 1234/Page

Number 4/charmin.com/videoitssofluffy

The user may then access his mobile device and input the category type to the device to which the User wishes to link, i.e., Periodicals-Magazines. The user would then indicate the UPC of the periodical and the UPC of the edition (if applicable), and the page number of the content. Once the user indicates this information, he may use his device to transmit to the server the above information and the user's ID information all in a unique link code.

The server upon receiving the information may then execute a lookup of its database to find if any item matches the requested item, and inform the user of the item or items that match the request. In the event that the server resolves the request with several items that match, due to several linked items being on the same page, then the user would be given the choice by name to select the item of interest, e.g.,:

Story on EuroDisney,

Charmin Ad,

Ad for US Army.

The user would receive or select the item of interest and be able to have further access to additional content with supplied global computer network links, and also be able to transmit the content including associated links, to another computer, e.g., a home based computer, for later access.

Options regarding the use of the linked information include the ability of the user to (a) receive more information on the ad, (b) e-mail the advertiser, (c) e-mail the ad to any other address on the Internet, (d) request additional information on the product(s) in the ad, and (e) purchase the product from the manufacturer.

Print Media—Catalog Items:

As described above, related prior art found in U.S. Pat. Nos. 5,933,829 and 5,978,773 and the pending application of the present inventor, discusses placing barcodes or other symbology next to or adjacent or as part of an item that the provider wants linked to a particular global computer network location, but these techniques may not be suitable for marking a catalog that contains many items since to place symbologies such as barcodes next to each desired catalog item to be linked may prove to be confusing to the user, cumbersome, and graphically intrusive. An embodiment of the present invention provides a means to link content without having to put symbologies next to the particular catalog items. More particularly, the present invention details the indexing of content by creating a code link using just the variables of the UPC number of the catalog (or the name and edition number of the catalog), the UPC number of the edition (if applicable), and the page number. The exact sequence and procedure for the links may be as follows:

The desired linker (catalog publisher) puts standard information links, e.g., URL addresses or information content, onto the computer server that accesses the global computer network (Internet). The addresses or information content is cross related to the individual catalog item by the UPC number of the catalog, or, if there is no UPC, the name and edition number of the catalog, the UPC number of the edition of the catalog (if applicable), and the page number of the content, and any other identification or defining parameters. For instance, if a provider such as The Sharper Image wanted to link a catalog item on page 14 in the Mar. 1, 2000 catalog, the publisher would inform the server that the name of the item he wants to link to is:

Periodical-Catalog,

Ionic Hair Brush,

UPC Number 123456789012,

Page Number 14.

The publisher would then give the computer server the content that he wants related to the ad, in this case a videostream commercial of the ad and a description:

Ionic Hair Brush,

Hair Care was Never so Easy!

www.sharperimage/ionicbrush/video4823.

The publisher may also place highlighting or a marking icon or dot signifying to the user that linked additional content is available for this catalog item.

The computer server is programmed to then place this content at a central site that is accessible from the selected mobile devices or search website (e.g., the BarPoint site). The server operator would code the link by the above supplied information. For example, in the above event the unique code might be:

Periodical-Catalog/Ionic Hair Brush/UPC Number 123456789012/Page Number 20/www.sharperimage/Iionicbrush/video4823

The user may then access his mobile device and input the category type to the device to which he wishes to link. In this case it would be Periodicals-Catalog and the user would then indicate the UPC of the catalog or the name and edition of the catalog and the UPC of the edition (if applicable), and the page number of the content. Once the user has indicated the appropriate information he may use his mobile device to transmit to the server the above information and the user's ID information all in a unique link code.

The server would then execute the lookup of its database to find if any item matches the requested item, and then inform the user of the item or items that match the request. In the event that the server resolves the request with several items that match due to several linked items occurring on the same page, then the user would be given the choice by name to select the item of interest, e.g.,:

Ionic Hair Brush,

Talking KeyRing,

Star Wars Collectible.

The user may then select and receive information on the item of interest and be able to have further access to additional content with supplied global computer network links, and also to transmit the content including associated links, to another computer for later access.

Print Media—Text in Printed Material:

Linking to selected text items in books, magazines, newspapers, or any other printed medium may be accomplished as follows.

The linker desiring to link text content information (content provider) would put standard information links, e.g., URL addresses or information content, on the computer server that accesses the global computer network (Internet.) The text content is indexed, without having to put symbologies next to the particular content, by creating a code link using just the variables of the UPC or ISBN number of the source (book, magazine, etc.) or, alternatively, the name of the book if the UPC is unavailable, the. UPC number of the edition (if applicable), the page number, and the item or footnote of interest.

The exact sequence and procedure for the links are as follows:

The linker or content producer puts standard information links, such as URL addresses or information content, onto the computer server that accesses the global computer network, which addresses or information content is cross related to selected printed medium content or text by the UPC or ISBN number of the content, the UPC number of the edition of the content (if applicable), the page number of the content, and the footnote number and any other defining or identification parameters. For instance, if the editor of a book about a public figure, e.g., Leonard Bernstein, wanted to link a particular series of words or footnote to the Internet, he would inform the server that the content to which he would like to link is:

Book,

Leonard Bernstein,

UPC Number 3084678567631,

Page Number 126,

Footnote 88.

The editor would then give the computer server the content that he wants related to the printed passage, in this case a videostream and a description:

Leonard Bernstein,

Modern composer and conductor 1911–1992,

Performed in Carnegie Hall on many occasions,

Audio track available www.composers.com/bernstein

Video profile available www.composers.com/leonardbernstein.mpg

The editor or content producer may also place highlighting or a marking icon or dot into the passage signifying to the user that linked information is available for a particular part of the printed item. It is preferred that the manner of marking the linked items be to present them in underlined and highlighted form so that they resemble computer hyperlinks that appear frequently on the Internet.

A sample passage with two links may be as follows:

In the course of modern music there have been many great conductors. A recent great that appeared on the music scene in 1943 was Leonard Bernstein[87]. Mr. Bernstein performed many times in Carnegie Hall[88] in New York and was hailed as . . .

The computer server is programmed to then place this content at a central site that is accessible from the selected mobile devices or search website (e.g., the BarPoint site). The server operator would code the link with the above supplied information.

For example in the above event the unique code might be:

Book/Leonard Bernstein/UPC Number 3084678567631/Page Number 126/Footnote88

If the content producer wishes to link the next set of particular text, e.g., for Carnegie Hall, he can also provide that link.

The user may then access his mobile device and input the category type to which the user wants to link. In this case it would be "Books". The user can then indicate the UPC of the book and the page number and the location of the text or footnote number of the desired content. Once the user indicates this information, the user's device may transmit to the server the above information and the user's ID information all in a unique link code.

The server using the received information can then execute a lookup of its database to find if any item matches the requested item, and then inform the user of the item or items that match the request.

The user may then receive information from the global computer network on the particular item of interest, be able to have further access to additional content with supplied global computer network links, and also to transmit the content including associated links, to another computer or device for later access.

Options for using the information can include the ability of the user to (a) receive more information on the particular link, (b) e-mail the author of the content, (c) e-mail the supplied information to any other address on the Internet, and (d) enter into a discussion group on the item with other parties on the global computer network.

It should be noted that the above applications apply whether the user has a mobile device that can connect to the Internet, such as current PALM VII wireless PDAs, or internet enabled WAP phones, or a standard non-communication PDA. In the event of the latter, the information link is stored on the PDA and then later communicated to a device connected to the global computer network (Internet) where the information link is then communicated to the server and the information requested is resolved. Additionally, in the event a user does not have a mobile device, the information relating to the media may be manually recorded and later input into a device, i.e., computer, connected to the global information network or Internet where the information link is then communicated to the server and the information requested is resolved.

It will be understood by those of skill in the art that a variety of combinations of hardware and software may be used to implement all of the features of the invention and that the ability to select, assemble, and connect the hardware and adapt and write the software for such combinations, will be readily within the purview of the skilled artisan using the foregoing descriptions and suggestions without the need for undue experimentation. Applicant has assembled and is operating such a system but it will be appreciated that its description here would serve no practical purpose by way of enablement as it would be too specialized and extensive to include in this application and is constantly being changed and updated during testing. Also, technological progress in the field would probably render such a particular current embodiment obsolete by the time this application issues.

What is claimed is:

1. A system for linking to an electronic network containing a supply of information related to an item in the content of external media observable by a user and for presenting information from said supply to a user upon the user's request, said system comprising:

a database storing information that is related to an item in the content of external media observable by a user and compiled by a provider of said item-related information for presentation to the user;

an implementing server coupled to said electronic network and comprising said database and storing added information that is compiled by said provider and associated with said item-related information stored in said database which added information relates to where further item-related information of said supply can be located on the electronic network;

an input terminal operable by a user, when interested in information relating to said item in the external media being observed, to send a coded input for linking to and accessing said implementing server, said coded input comprising codes associated with said item in said external media by said provider and addressing said database-stored item-related information and said added information to locate said further item-related information of said supply; and means, responsive to said coded input from said user, for activating said implementing server to provide said item-related information stored in said database and said further item-related information of said supply from the electronic network ready for presentation to the user in accordance with the codes in said coded input.

2. A system as in claim 1 wherein said input terminal comprises a mobile device.

3. A system as in claim 1 further comprising a central site for receiving said item-related information stored in said database from said implementing server and linkable to said input terminal by said coded input.

4. A system as in claim 1 further comprising a marker, disposed by the provider in said media being observed, indicating that item information is available on an item being observed in said media.

5. A system as in claim 1 wherein said codes in said coded input comprise a code indentifying the user.

6. A system as in claim 1 wherein said external media comprises video.

7. A system as in claim 1 wherein said external media comprises film.

8. A system as in claim 1 wherein said external media comprises audio.

9. A system as in claim 1 further comprising means in said input terminal for responding to said implementing server after the providing of said item-related information stored in said database thereto.

10. A system as in claim 1 further comprising means for collecting and storing at said input terminal said added information associated with said further item-related information of said supply, and means, operable by the user, for activating said implementing server using said collected and stored added information to provide a supply of further item-related information from the electronic network ready for presentation to the user in accordance with the coded input.

11. A method for linking to an electronic network containing a supply of information related to an item in the content of external media observable by a user and for presenting information from said supply to a user upon the users request, said method comprising the steps of:

storing in a database information that is related to an item in the content of external media observable by a user and compiled by a provider of said item-related information for presentation to the user;

coupling an implementing server comprising said database to said electronic network and storing added information in said implementing server that is compiled by said provider and associated with said item-related information stored in said database, which added information relates to where further item-related information of said supply can be located on the electronic network;

providing an input terminal operable by a user, when interested in information relating to said item in the external media observed, to send a coded input for linking to and accessing said implementing server, said coded input comprising codes associated with said item in said external media by said provider and addressing said database-stored item-related information and said added information to locate said further item-related information of said supply; and in response to said coded input from said user, activating said implementing server to provide said item-related information stored in said database and said further item-related information of said supply from the electronic network ready for presentation to the user in accordance with the codes in said coded input.

12. A method as in claim 11 wherein said input terminal is wirelessly coupled to said implementing server.

13. A method as in claim 11 wherein said input terminal comprises a mobile device.

14. A method as in claim 11 wherein said input terminal directs said item-related information stored in said database and said further item-related information of said supply, when provided by said implementing server, to an external storage device.

15. A method as in claim 11 wherein a marker is disposed by the provider in said media being observed indicating that item information is available on an item being observed in said media.

16. A method as in claim 11 wherein said codes in said coded input comprise a code indentifying the user.

17. A method as in claim 11 wherein said external media comprises video and said codes in said coded input comprise a code identifying a program being shown and a code identifying the time.

18. A method as in claim 11 wherein said external media comprises film and said codes in said coded input comprise a code identifying a frame of said film.

19. A method as in claim 11 wherein said external media comprises audio and said codes in said coded input comprise a code identifying a sound marker in said audio.

20. A method as in claim 11 wherein said external media comprises printed material and said codes in said coded input comprise a code identifying a marker icon in said printed material.

21. A method as in claim 11 further comprising the steps of collecting and storing at said input terminal said added information associated with said further item-related information of said supply, and means, operable by the user, for activating said implementing server using said collected and stored added information to provide a supply of further item-related information from the electronic network ready for presentation to the user in accordance with the coded input.

* * * * *